United States Patent
Fedoseyev et al.

(10) Patent No.: US 9,331,552 B2
(45) Date of Patent: May 3, 2016

(54) ROTOR ASSEMBLY WITH HEAT PIPE COOLING SYSTEM

(71) Applicant: Tesla Motors, Inc., Palo Alto, CA (US)

(72) Inventors: Lev Fedoseyev, San Jose, CA (US);
Edwin Marcum Pearce, Jr., San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 358 days.

(21) Appl. No.: 13/917,545

(22) Filed: Jun. 13, 2013

(65) Prior Publication Data

US 2014/0368064 A1    Dec. 18, 2014

(51) Int. Cl.
*H02K 9/197*    (2006.01)
*H02K 9/20*    (2006.01)

(52) U.S. Cl.
CPC . *H02K 9/20* (2013.01); *H02K 9/197* (2013.01)

(58) Field of Classification Search
CPC .................................. H02K 9/20; H02K 9/197
USPC .................................. 310/54, 57, 60 A, 61, 64
IPC .............................................. H02K 9/197, 9/20
See application file for complete search history.

(56) References Cited

U.S. PATENT DOCUMENTS

| | | | |
|---|---|---|---|
| 3,914,630 A * | 10/1975 | Lloyd et al. | 310/61 |
| 5,589,720 A | 12/1996 | Berger | |
| 6,191,511 B1 | 2/2001 | Zysset | |
| 6,329,731 B1 | 12/2001 | Arbanas et al. | |
| 6,626,649 B2 | 9/2003 | Cowans | |
| 6,734,585 B2 | 5/2004 | Tornquist et al. | |
| 7,009,317 B2 | 3/2006 | Cronin et al. | |
| 7,042,121 B2 | 5/2006 | De Filippis et al. | |
| 7,112,901 B1 | 9/2006 | Soitu | |
| 7,156,195 B2 | 1/2007 | Yamagishi et al. | |
| 7,443,062 B2 * | 10/2008 | Dong et al. | 310/54 |
| 7,489,057 B2 * | 2/2009 | Zhou | H02K 9/19 310/61 |
| 7,569,955 B2 * | 8/2009 | Hassett et al. | 310/54 |
| 7,579,725 B2 | 8/2009 | Zhou et al. | |
| 8,450,888 B2 * | 5/2013 | Shafer | H02K 1/20 310/54 |
| 2006/0158059 A1 * | 7/2006 | Steinmeyer | H02K 9/00 310/261.1 |
| 2010/0289386 A1 * | 11/2010 | Gerstler | H02K 1/2773 310/60 A |

OTHER PUBLICATIONS www.Engineering-Dictionary.org—Definition of the term "Interference Fit".*

* cited by examiner

*Primary Examiner* — John K Kim
(74) *Attorney, Agent, or Firm* — J. Richard Soderberg

(57) ABSTRACT

An electric motor cooling system is provided in which at least one heat pipe is captured within at least one hollow region within the motor's rotor shaft. An end of the heat pipe that extends out and away from the end of the rotor shaft is coupled to a heat exchanger, for example a heat sink in which the fins of the heat sink are shaped as fan blades. During motor operation, as the rotor heats up thermal energy is absorbed by the heat pipe within the rotor shaft and transferred to the heat sink for efficient removal.

21 Claims, 3 Drawing Sheets

ROTOR ASSEMBLY WITH HEAT PIPE COOLING SYSTEM

FIELD OF THE INVENTION

The present invention relates generally to electric motors and, more specifically, to a method and apparatus for efficiently cooling the rotor assembly within an electric motor.

BACKGROUND OF THE INVENTION

Electric motors can generate considerable heat, thereby making motor cooling difficult, especially if the electric motor in question is used as the traction motor of an electric or hybrid vehicle where size and weight constraints are coupled with the need for high motor output. In addition to being efficient, the means used to cool the motor must be capable of operating in a variety of environments since the motor in a vehicle is typically subjected to a wide range of ambient temperatures, humidity levels and dust/dirt levels. Lastly, in order to avoid excessive wear due to differential thermal expansion, it is important to cool the internal motor components, such as the rotor, as well as the outer motor components, such as the casing and stator.

A variety of approaches have been taken to meet the cooling demands placed on a vehicle's electric motor. For example, U.S. Pat. No. 6,191,511 discloses using a closed loop, liquid cooling circuit to try and achieve a temperature balance within the motor, the cooling circuit passing the coolant through both the stator and a hollow rotor shaft. Within the hollow rotor shaft is a stationary injection tube, the injection tube fixed to the stator flange. The coolant is pumped through the injection tube to the end of the rotor shaft where it is driven back between the injection tube and the hollow rotor. The coolant then passes through a cylindrical cooling chamber extending over the length and periphery of the stator before cooling the stator structure and being returned to the injection tube.

U.S. Pat. No. 6,329,731 discloses a liquid cooled electric motor in which one of the main elements of the planetary gear drives the displacement pump of the cooling circuit. The coolant is driven through a stationary tube about which the hollow rotor shaft rotates. The coolant then passes between the stationary tube and the hollow rotor shaft before passing through a radiator incorporated into the motor and planetary gear casing.

U.S. Pat. No. 7,156,195 discloses an electric motor in which the liquid coolant is collected within the reduction gear case, not the motor case, thus avoiding deterioration and alteration of the motor magnets. The coolant from the reservoir is pumped through the end of a passage in the drive shaft where it flows toward the motor. Part of the coolant is sprayed onto the reduction gears while the rest of the coolant is pumped between the drive shaft and the reduction gear shaft and the motor output shaft.

Co-assigned U.S. Pat. Nos. 7,489,057 and 7,579,725 disclose a cooling system and method of use, respectively, utilizing a hollow rotor shaft. A coolant feed tube, rigidly attached to the hollow rotor shaft, pumps coolant into the rotor while rotating at the same rate as the rotor shaft. When the coolant exits the end of the feed tube it flows against the inside surface of the closed end of the rotor shaft where it is forced to change direction and flow back through the space between the outer surface of the feed tube and the inner surface of the hollow rotor shaft. After passing through the rotor shaft, the coolant is expelled through the open end of the rotor.

While the prior art discloses a number of techniques for cooling an electric motor, specifically the rotor of an electric motor, a robust, reliable, high efficiency cooling system that is straightforward and cost effective to manufacture and install is desired. The present invention provides such a rotor and cooling assembly.

SUMMARY OF THE INVENTION

An electric motor cooling system is provided, the system including an electric motor rotor assembly, at least one heat pipe and a heat exchanger. The rotor assembly is comprised of a core assembly rigidly coupled to the motor's rotor shaft, where the rotor shaft includes a first end and a second end distal from the first end with the first end being closed and the second end including at least one opening. The rotor shaft further includes at least one hollow region within the shaft that extends from the at least one opening in the second end towards the first closed end. A portion of the heat pipe(s) is captured within the hollow region(s) within the shaft while a second portion of the heat pipe(s) extends out of and beyond the opening(s) in the rotor shaft. The heat exchanger is thermally coupled to the second portion of the heat pipe(s). The centerline of the hollow region(s) is preferably parallel to the centerline corresponding to the rotor shaft, and more preferably co-axial with the rotor shaft's centerline. The heat pipe(s) may be bonded, interference fit, brazed or soldered within the hollow region(s) of the rotor shaft. A single hollow may include a single heat pipe, multiple heat pipes, or multiple heat pipes that have been partially flattened to form elliptically-shaped heat pipes. The heat exchanger may be comprised of a heat sink, for example a heat sink comprised of a plurality of fan blades (e.g., radial fan blades, forward curved fan blades, backward curved fan blades, axial fan blades, etc.) that may be at least partially surrounded by a fan shroud. The heat exchanger may be thermally coupled to a liquid cooling system. The heat pipe(s) may be fabricated from copper, copper alloys, nickel, stainless steel or aluminum. The working fluid contained within the heat pipe(s) may consist of water, acetone, methanol, ammonia or some combination thereof. The heat pipe(s) may include a wicking material.

A further understanding of the nature and advantages of the present invention may be realized by reference to the remaining portions of the specification and the drawings.

DESCRIPTION OF THE SPECIFIC EMBODIMENTS

Figure 1:
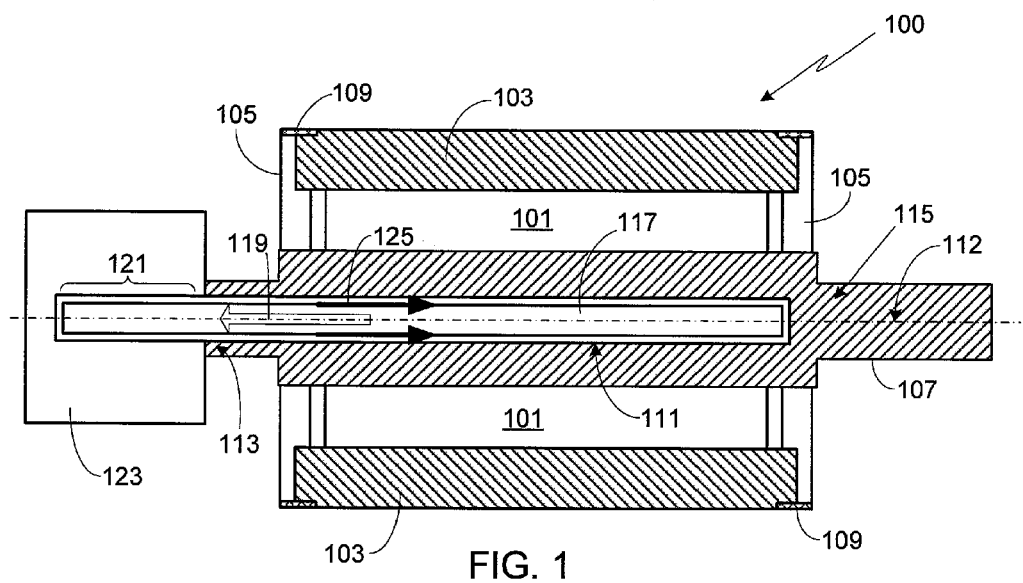
FIG. 1 is a cross-sectional view of the primary components of a rotor assembly in accordance with a preferred embodiment of the invention.

FIG. 1 provides a cross-sectional view of the primary components of a rotor assembly 100 in accordance with a preferred embodiment of the invention. It will be appreciated that other configurations may be used with the invention, and the specific designs and dimensions provided relative to the preferred embodiment are only meant to illustrate, not limit, the scope of the invention and should not be considered to be to scale. Additionally, it should be understood that identical element symbols used on multiple figures refer to the same component, or components of equal functionality.

The core assembly is comprised of a plurality of laminated discs 101, typically referred to as the rotor stack, and a plurality of conductor bars 103, commonly referred to as rotor bars. The ends of rotor bars 103 extend beyond either end of the laminated magnetic core 101. An end cap 105, or similar means, is used to mechanically and electrically join the ends of the rotor bars 103. The core assembly is coaxially mounted to a rotor shaft 107. Shaft 107 may include keys or similar means (not shown) to locate and position the core assembly about its central axis. Alternately, rotor shaft 107 may be press-fit into the core assembly which is preferably held at an elevated temperature during the press-fitting operation. In some configurations, located at either end of the core assembly is a rotor containment ring 109. Additionally, rotor assembly 100 will typically include a variety of ball bearing assemblies as well as various washers, seals, and retaining rings that are not shown in the figures.

A portion 111 of rotor shaft 107 is hollow, such that one end 113 of the rotor shaft is open while the other end 115 is closed. Preferably the centerline 112 of hollow portion 111 is parallel to the rotor shaft centerline and, in at least one embodiment such as that shown in FIG. 1, co-axial with the rotor shaft centerline (also centerline 112 in FIG. 1). Although not a requirement of the invention, preferably shaft 107 is hollow over the majority of its length, including the entire portion of the shaft in contact with the rotor stack, thereby insuring efficient cooling of the rotor assembly. As described in further detail below, at least one heat pipe 117 is located within the hollow portion 111 of rotor shaft 107. Preferably heat pipe 117 extends beyond the end of shaft 107 as shown. Heat pipe(s) 117 may be interference fit (e.g., press-fit) within shaft 107. Alternately, heat pipe(s) 117 may be bonded, brazed, soldered or otherwise held within shaft 107.

Regardless of the technique used to hold heat pipe(s) 117 within shaft 107, it is important to insure that good thermal contact is made between the heat pipe(s) 117 and the rotor shaft 107, thereby insuring efficient cooling of the rotor assembly. In some configurations direct contact is made between the outer surface of the heat pipe(s) 117 and the inner surface of the hollow portion 111 of rotor shaft 107. In other configurations a thermally conductive adhesive is used to bond the outer surface of the heat pipe(s) 117 to the inner surface of the hollow portion 111 of rotor shaft 107. In still other configurations a thermally conductive brazing material is used to braze the outer surface of the heat pipe(s) 117 to the inner surface of the hollow portion 111 of rotor shaft 107. In still other configurations a thermally conductive material is located between the outer surface of the heat pipe(s) 117 and the inner surface of the hollow portion 111 of rotor shaft 107.

Figure 2:
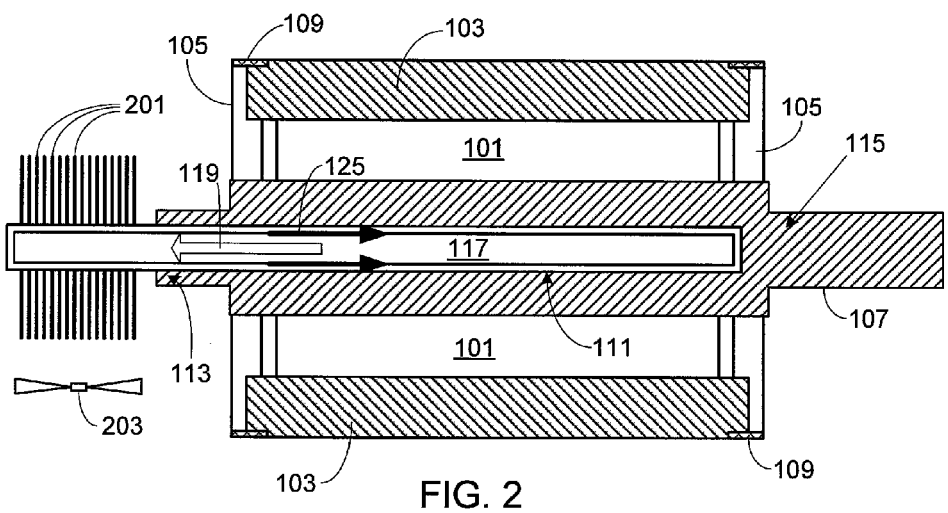
FIG. 2 provides a similar view of a rotor assembly to that shown in FIG. 1, with the addition of an air-cooled heat exchanger coupled to the heat pipe(s)
Figure 3:
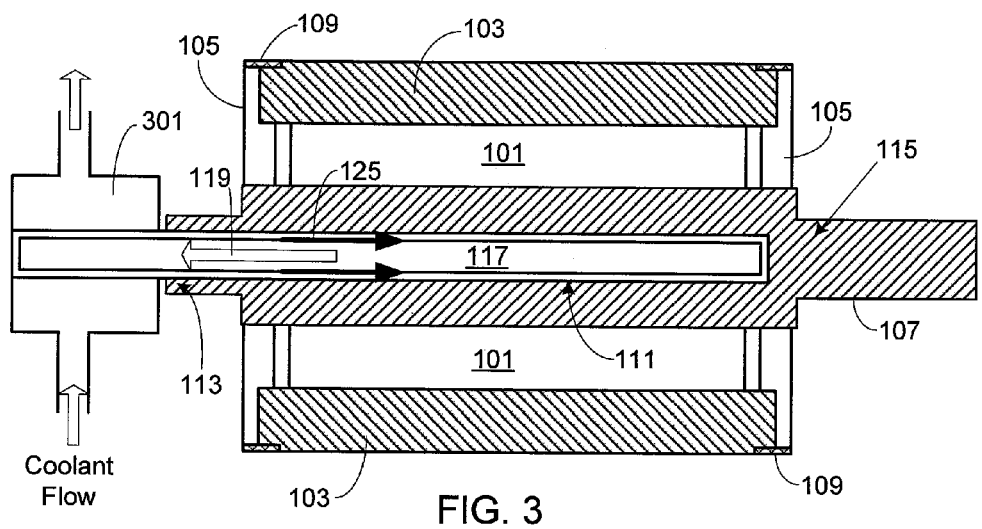
FIG. 3 provides a similar view of a rotor assembly to that shown in FIG. 1, with the addition of a liquid-cooled heat exchanger coupled to the heat pipe(s)

During motor operation, as the rotor heats up thermal energy heats the end of heat pipe(s) 117 that is positioned inside of the rotor shaft causing the working fluid contained within the heat pipe(s) 117 to vaporize. Since the heat pipe(s) is sealed under very low pressure, the working fluid vaporizes at a relatively low temperature. The vaporized working fluid, which flows freely within the heat pipe(s), flows in direction 119 where it condenses on cold region 121 of the heat pipe(s). As the vapor condenses, thermal energy is released which is withdrawn by cooling system 123. The condensed working fluid then flows in direction 125 via a wicking material coating the inside surface of heat pipe(s) 117 back to the heated region of the heat pipe(s) where the process starts over. It should be understood that the invention is not limited to a particular means of cooling region 119 and withdrawing the thermal energy transferred to this region by the action of the heat pipe(s). For example, cooling system 123 may be comprised of a heat sink utilizing a plurality of cooling fins 201 as illustrated in FIG. 2. Preferably air is forced over and through the cooling fins, for example using a blower fan 203, thus accelerating heat withdrawal. Alternately cooling system 123 may utilize a liquid coolant that is pumped through a heat exchanger 301 as illustrated in FIG. 3.

Figure 4:
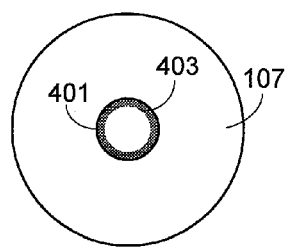
FIG. 4 is a cross-sectional view of a rotor shaft and a single heat pipe contained therein.
Figure 5:
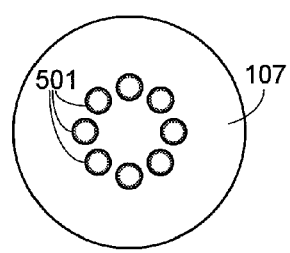
FIG. 5 is a cross-sectional view of an alternate rotor shaft utilizing multiple heat pipes.
Figure 6:
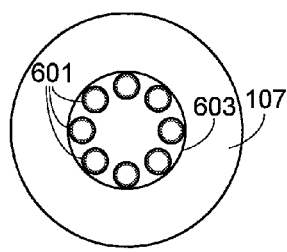
FIG. 6 is a cross-sectional view of an alternate rotor shaft utilizing multiple heat pipes.
Figure 7:
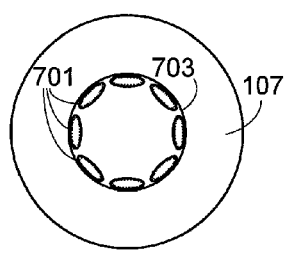
FIG. 7 is a cross-sectional view of an alternate rotor shaft utilizing multiple vapor chambers.

FIG. 4 provides a cross-sectional view of rotor shaft 107. Captured within the hollow portion 111 of rotor shaft 107 is a single heat pipe 401. In this view wick 403 is visible, wick 403 providing the preferred means for transferring the condensed working fluid within the heat pipe back to the high temperature region of the shaft. FIG. 5 provides a cross-sectional view of an alternate embodiment in which multiple heat pipes 501 are captured within multiple cavities (i.e., multiple hollow portions) within rotor shaft 107. FIG. 6 provides a cross-sectional view of an alternate embodiment in which multiple heat pipes 601 are captured within a single hollow portion 603 within rotor shaft 107. FIG. 7 provides a cross-sectional view of an alternate embodiment in which multiple heat pipes 701 are captured within a single hollow portion 703 within rotor shaft 107, where each heat pipe has been partially flattened such that the cross-section changes from cylindrical to elliptical. Note that such an elliptical heat pipe is often referred to as a vapor chamber.

Regardless of whether a single heat pipe is used such as that illustrated in FIGS. 1-4, or multiple heat pipes as illustrated in FIGS. 5 and 6, or one or more vapor chambers as illustrated in FIG. 7, preferably the heat pipe is fabricated from copper or a copper alloy. It should be understood, however, that other materials that exhibit high thermal conductivity may be used (e.g., nickel, stainless steel, aluminum, etc.). In the preferred embodiment, the heat pipe(s) uses a sintered metal powder wick, for example one fabricated from copper (assuming a copper heat pipe), although other types of wicks may be used (e.g., grooved wick, mesh wick, metal mesh wick, etc.). In the preferred embodiment, water is used as the working fluid sealed under partial vacuum within the heat pipe(s), although other fluids may be used depending upon the expected temperatures as well as the materials used for the pipe and the wick. Other exemplary working fluids include methanol, acetone, ammonia, or some combination thereof. Note that for higher expected temperatures other working fluids are preferred (e.g., mercury, potassium, sodium, etc.).

Figure 8:
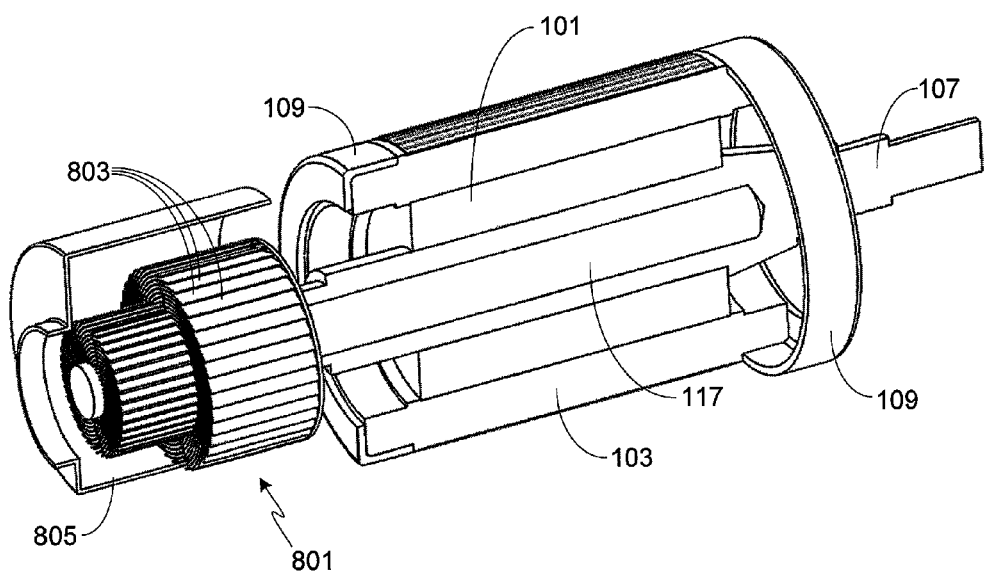
FIG. 8 illustrates a preferred rotor shaft assembly in accordance with the invention.

FIG. 8 provides a perspective, partial cross-sectional view of a preferred embodiment of the invention. In this embodiment the cooling system 123 is comprised of a heat sink in the form of a fan assembly 801. The individual fan blades 803 of fan assembly 801, which are thermally coupled to end region 121 of the heat pipe(s), perform the function of the fins of the heat sink. Furthermore, as rotor shaft 107 rotates during motor operation, fan blades 803 force air to flow along and past each blade's surface, thereby promoting efficient heat withdrawal and eliminating the need for a separate blower (e.g., blower 203 in FIG. 2). Preferably this embodiment also includes a fan shroud 805 as shown, shroud 805 promoting efficient air flow while providing protection to the fan assembly 801. It should be understood that fan blades 803 may utilize any of a variety of fan configurations including, but not limited to, radial fan blades, forward curved fan blades, backward curved fan blades, axial fan blades, etc.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An electric motor cooling system, comprising:
    an electric motor rotor assembly comprised of a core assembly rigidly coupled to a rotor shaft, said rotor shaft comprising:
        a first end of said rotor shaft, wherein said first end is closed;
        a second end of said rotor shaft distal from said first end, wherein said second end of said rotor shaft includes at least one opening;
        a least one hollow region within said rotor shaft and extending from said at least one opening in said second end towards said first end of said rotor shaft;
    at least one heat pipe, wherein a first portion of said at least one heat pipe is captured within said at least one hollow region within said rotor shaft, wherein said first portion of said at least one heat pipe is thermally coupled to said rotor shaft, and wherein a second portion of said at least one heat pipe extends out of and beyond said at least one opening in said second end of said rotor shaft; and
    a heat exchanger thermally coupled to said second portion of said at least one heat pipe;
    wherein said at least one hollow region is comprised of a single hollow region within said rotor shaft, wherein a first centerline corresponding to said single hollow region is co-axial with a second centerline corresponding to said rotor shaft, and wherein said at least one heat pipe is comprised of a plurality of heat pipes captured within said single hollow region.

2. The electric motor cooling system of claim 1, wherein each of said plurality of heat pipes is brazed within a corresponding one of said plurality of hollow regions of said rotor shaft.

3. The electric motor cooling system of claim 1, wherein each of said plurality of heat pipes is soldered within a corresponding one of said plurality of hollow regions of said rotor shaft.

4. The electric motor cooling system of claim 1, wherein each of said plurality of heat pipes is partially flattened to form a plurality of elliptically-shaped heat pipes.

5. The electric motor cooling system of claim 1, wherein said heat exchanger is comprised of a heat sink attached to said second portion of each of said plurality of heat pipes.

6. The electric motor cooling system of claim 5, wherein said heat sink is comprised of a plurality of fan blades.

7. The electric motor cooling system of claim 6, wherein said plurality of fan blades is comprised of a plurality of radial fan blades.

8. The electric motor cooling system of claim 6, wherein said plurality of fan blades is curved forward in a direction or rotation of said plurality of fan blades.

9. The electric motor cooling system of claim 6, wherein said plurality of fan blades is curved backward in a direction or rotation of said plurality of fan blades.

10. The electric motor cooling system of claim 6, wherein said plurality of fan blades is comprised of a plurality of axial fan blades.

11. The electric motor cooling system of claim 6, further comprising a fan shroud at least partially surrounding said plurality of fan blades.

12. The electric motor cooling system of claim 1, further comprising a liquid cooling system thermally coupled to said heat exchanger.

13. The electric motor cooling system of claim 1, wherein said at least one heat pipe is fabricated from a material selected from the group of materials consisting of copper, copper alloys, nickel, stainless steel, and aluminum, and wherein a working fluid contained within each of said at least one heat pipes is selected from the group of working fluids consisting of water, acetone, methanol, ammonia and combinations of at least some of water, acetone, methanol and ammonia.

14. The electric motor cooling system of claim 13, wherein each of said at least one heat pipes further comprise a wicking material.

15. An electric motor cooling system, comprising:
    an electric motor rotor assembly comprised of a core assembly rigidly coupled to a rotor shaft, said rotor shaft comprising:
        a first end of said rotor shaft, wherein said first end is closed;
        a second end of said rotor shaft distal from said first end, wherein said second end of said rotor shaft includes at least one opening;
        a least one hollow region within said rotor shaft and extending from said at least one opening in said second end towards said first end of said rotor shaft;
    at least one heat pipe, wherein a first portion of said at least one heat pipe is captured within said at least one hollow region within said rotor shaft, wherein said first portion of said at least one heat pipe is thermally coupled to said rotor shaft, and wherein a second portion of said at least one heat pipe extends out of and beyond said at least one opening in said second end of said rotor shaft; and
    a heat exchanger thermally coupled to said second portion of said at least one heat pipe;
    wherein said at least one hollow region is comprised of a plurality of hollow regions within said rotor shaft, wherein each centerline corresponding to each of said plurality of hollow regions is parallel to and spaced apart from a rotor shaft centerline, and wherein said at least one heat pipe is comprised of a plurality of heat pipes corresponding to said plurality of hollow regions.

16. The electric motor cooling system of claim 15, wherein each of said plurality of heat pipes is interference fit within a corresponding one of said plurality of hollow regions of said rotor shaft.

17. The electric motor cooling system of claim 15, wherein each of said plurality of heat pipes is bonded within a corresponding one of said plurality of hollow regions of said rotor shaft.

18. The electric motor cooling system of claim 15, wherein a first centerline of each said plurality of hollow regions is co-axial with a second centerline corresponding to said rotor shaft, and wherein each of said plurality of heat pipes is captured within a corresponding one of said plurality of hollow regions.

19. The electric motor cooling system of claim 15, wherein each of said plurality of heat pipes is brazed within a corresponding one of said plurality of hollow regions of said rotor shaft.

20. The electric motor cooling system of claim 15, wherein each of said plurality of heat pipes is soldered within a corresponding one of said plurality of hollow regions of said rotor shaft.

21. The electric motor cooling system of claim 15, wherein each of said plurality of heat pipes is partially flattened to form a plurality of elliptically-shaped heat pipes.

\* \* \* \* \*